United States Patent [19]
Andrews

[11] Patent Number: 5,602,872
[45] Date of Patent: Feb. 11, 1997

[54] METHOD AND SYSTEM FOR CONTROLLING AN ADAPTIVE, BLIND, FRACTIONALLY SPACED EQUALIZER

[75] Inventor: Michael S. Andrews, Escondido, Calif.

[73] Assignee: Texas Instruments Incorporated, Dallas, Tex.

[21] Appl. No.: 359,123

[22] Filed: Dec. 19, 1994

[51] Int. Cl.$^6$ .................................................. H03H 7/30
[52] U.S. Cl. ........................... 375/234; 375/232; 333/18; 364/724.2
[58] Field of Search .................................... 375/229, 230, 375/232, 234, 377; 333/18; 364/724.2

[56] References Cited

U.S. PATENT DOCUMENTS

| | | | |
|---|---|---|---|
| 4,607,377 | 8/1986 | Atobe et al. | 333/18 |
| 5,283,813 | 2/1994 | Shalvi et al. | 375/230 |
| 5,414,732 | 5/1995 | Kaufmann | 375/230 |

OTHER PUBLICATIONS

Haykin, Simon Editor, "*Blind Deconvolution*", 1994 Prentice Hall Information and System Sciences Series, pp. 24–27.

Haykin, Simon, "*Adaptive Filter Theory–Second Edition*", 1986 Prentice–Hall, Inc., pp. 725–744.

*Primary Examiner*—Stephen Chin
*Assistant Examiner*—Betsy P. Lee
*Attorney, Agent, or Firm*—Robert L. Troike; Tammy Williams; Richard L. Donaldson

[57] ABSTRACT

The present invention includes a method and system for controlling an equalizer equalizing data transmitted a communications channel which is oversampled at an oversampling rate of M. The method of the present invention includes the steps of initializing a plurality of data pointers and a first buffer stored in an input memory (22); generating a buffer full flag in response to filling the first buffer with a pre-determined number of data samples; initializing a counter (28) in response to the buffer full flag, the counter (28) generating an enable signal every M cycles; equalizing a portion of the pre-determined number of data samples in response to the enabling signal using an equalizer (20), where the portion of the pre-determined number of data samples is located using the plurality of data pointers; and adjusting the plurality of data pointers in response to the equalizing step using an FSE controller (24).

7 Claims, 3 Drawing Sheets

METHOD AND SYSTEM FOR CONTROLLING AN ADAPTIVE, BLIND, FRACTIONALLY SPACED EQUALIZER

NOTICE

Copyright © 1994 Texas Instruments Incorporated

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD OF THE INVENTION

This invention relates to adaptive filter equalizers and more particularly to a method and system for controlling an equalizer which includes an adaptive filter.

BACKGROUND OF THE INVENTION

Data communications is important to an ever increasing number of applications, both personal and business oriented. As the data itself becomes more critical and as the need to communicate that data increases, transmission speed becomes the focus of concern. Increasing the transmission speed, however, is not a straightforward process. As data is transmitted across the communications medium, i.e., telephone wire, cable, etc., the data signal is distorted. This distortion is generally in the form of noise and intersymbol interference. As more distortion is introduced, extracting the transmitted signal from the received signal becomes a more complicated process.

A common method used in extracting transmitted signals from received signals includes the use of an equalizer which includes an adaptive filter. Using adaptive equalization techniques, time varying characteristics of the transmitted signal are used to eliminate amplitude and phase distortion introduced by the communication channel. These distortion effects, however, extend beyond the time interval used to represent the data. Furthermore, as the need for faster and faster data communication increases, the need for a method and system which can retrieve a transmitted signal from the received signal with as little delay as possible increases.

One such system is shown in FIG. 1. The system includes a transversal filter 10 which accepts as input sampled data signals x(n), where n represents the sequence number of the data sample. The transversal filter 12 generates filtered output data, y(n), which is processed by a zero memory, non-linear estimator 12 to generate digitized output symbols ŷ(n). An error signal, e(n), is determined at summation 14 by subtracting the filtered output data, y(n), from the digitized output symbols, ŷ(n). An LMS processor 18 uses the error signal, e(n), to generate weights used to adjust the transversal filter 10 to the communications channel to reduce the error signal, e(n).

Intersymbol interference, one form of channel distortion, is caused by limited bandwidth in the channel. Sampling at a finite rate is another contributing factor. In retrieving the transmitted signal from the received signal typically oversampling with an equalizer is used to help minimize intersymbol interference. However, the equalizer which runs at the oversampling rate is much more complex and requires more calculations to accomplish the task.

Thus, what is needed is a efficient method and system for controlling an equalizer which reduces intersymbol interference when oversampling a transmitted data signal.

SUMMARY OF THE INVENTION

The present invention includes an efficient method and system of controlling an equalizer coupled to a data channel where the data transmitted through the data channel oversampling rate M.

The method of the present invention includes the steps of initializing a plurality of data pointers and a first buffer stored in an input memory; generating a buffer full flag in response to filling the first buffer with a pre-determined number of data samples; initializing a counter in response to the buffer full flag, the counter generating an enable signal every M cycles; equalizing a portion of the pre-determined number of data samples in response to the enabling signal, where the portion of the pre-determined number of data samples is located using the plurality of data pointers; and adjusting the plurality of data pointers in response to the equalizing step.

One embodiment of the system of the present invention includes means for generating a buffer full flag in response to storing a pre-determined number of data samples into a first buffer; means responsive to the buffer full flag for generating an enable signal every M cycles; the equalizer responsive to the enable signal for equalizing a portion of the pre-determined number of data samples, the portion of the pre-determined number of data samples determined using a plurality of data pointers into the first buffer; and means responsive to the enable signal for adjusting the plurality of data pointers in response to filtered output data from the adaptive filter included in the equalizer.

BRIEF DESCRIPTION OF THE DRAWINGS

For a better understanding of the present invention, reference may be made to the accompanying drawings, in which.

DETAILED DESCRIPTION OF THE PREFERRED EMBODIMENTS

The present invention provides a method and system for controlling an equalizer so that the data transmitted through the communications channel being equalized can be oversampled at an oversampling rate of M. One embodiment of the present invention includes a programmable digital signal processor (DSP) such as the TMS320Cxx family of DSP's manufactured by the assignee, Texas Instruments Incorporated. While a software implementation of the present invention greatly reduces power, space and manufacturing requirements, it is contemplated that a hard-wired implementation of the present invention may also be used.

Figure 1:
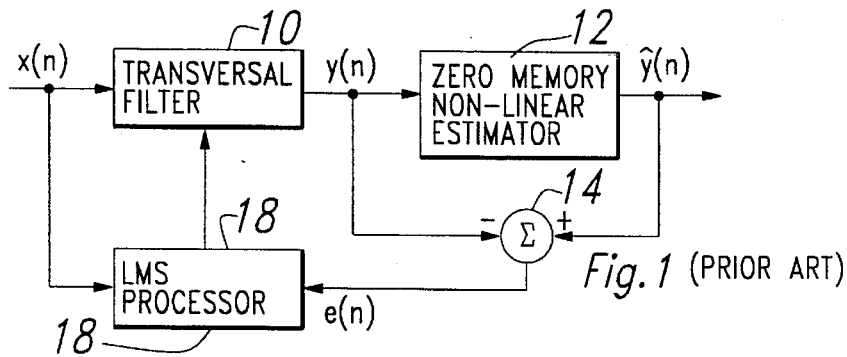
FIG. 1 is a block diagram illustrating an equalizer in the prior art.
Figure 2:
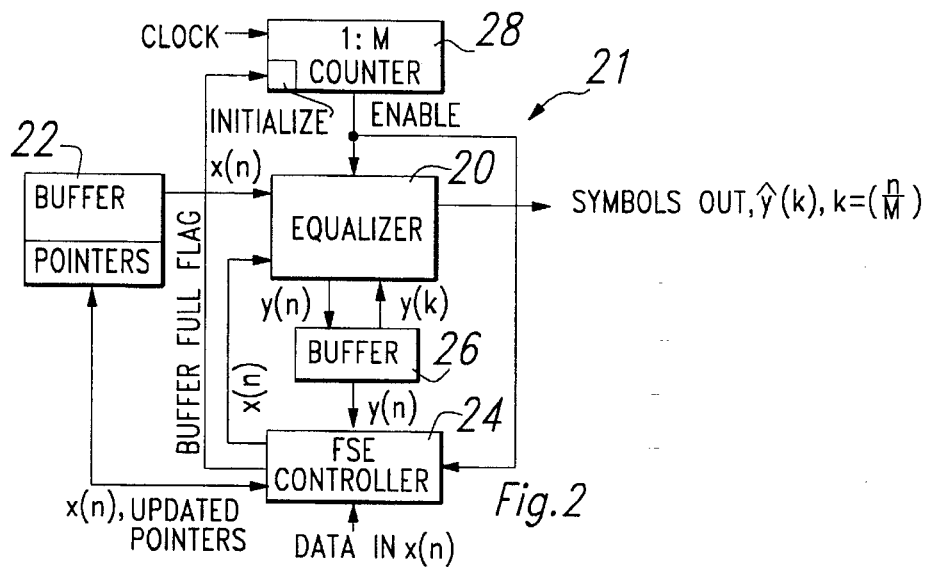
FIG. 2 illustrates a block diagram of an equalizer controlled using the present invention.

FIG. 2 shows a system 21 which includes an equalizer 20 controlled using the preferred embodiment. Sampled data, x(n), enter the system 21 through a fractionally spaced equalizer (FSE) controller 24. The FSE controller 24 loads the sampled data, x(n), into input memory 22 using a write address data pointer, a read address data pointer and an offset data pointer. When the number of data samples data loaded into the input memory 22 reaches a predetermined amount, the FSE controller 24 generates a buffer full flag which initiates counter 28. Thus, until a minimum pre-determined number of sample data points are stored in the input memory 22, the present invention prevents processing by the equalizer 20.

Once the minimum, pre-determined number of sample data points are stored in the input memory 22, the timing of further processing by the equalizer 20 is controlled by the counter 28. The counter 28 generates an enable signal once every M cycles. M is a positive, usually odd, integer, such as 3. This enable signal is used to cause the FSE controller 24 to transfer N data samples from the input memory 22 to the equalizer 20 and to initiate processing in the equalizer 20 of the transferred data samples. N is an integer which represents the number of taps in the equalizer 20. In the current embodiment, N is 7. The FSE controller 24 uses the set of data pointers to determine where in the input memory 22 the N data samples start. By initiating the equalizer 20 every M cycles instead of every cycle, the present invention reduces the number of computations performed by the equalizer 20.

As an example, in the present embodiment, if data samples x(0), x(1), x(2), x(3), . . . , x(20) are received, then, with N=7 and M=3, data samples x(0) through x(6), are initially sent to the equalizer 20. Then, after M cycles, data samples x(3) through x(9) are sent to the equalizer 20. After another M cycles, data samples x(6) through x(12) are sent to the equalizer 20. In this manner, the current embodiment of the present invention increase the processing speed of the input data samples, x(n).

While processing the sampled data, x(n), the equalizer 20 stores filtered output data, y(n) to and retrieves data from an output memory 26. In one embodiment to the present invention, both the input memory 22 and the output memory 26 are circular buffers but it is contemplated that other storage data structures may be used.

The input memory 22 also includes a plurality of pointers used by the FSE controller 24 to control the storage of data into and the retrieval of data from the circular buffer stored in input memory 22. These pointers include a data read pointer, a data write pointer and a data offset pointer. The data read pointer identifies the memory location in the input memory 22 from which to start reading data. The data write pointer identifies the memory location in the input memory 22 at which to write new data. The FSE controller 24, in response to the enable signal from the counter 28, uses filtered output data y(n) from the output buffer 26 to update the pointers to the input memory 22 as discussed in more detail hereinbelow.

In one embodiment of the present invention, the equalizer 20 is a blind, Bussgang type, fractionally spaced equalizer, where the coefficients of the adaptive filter included in the equalizer 20 are updated using the Bussgang algorithm, but it is contemplated that other variations are possible.

Figure 3:
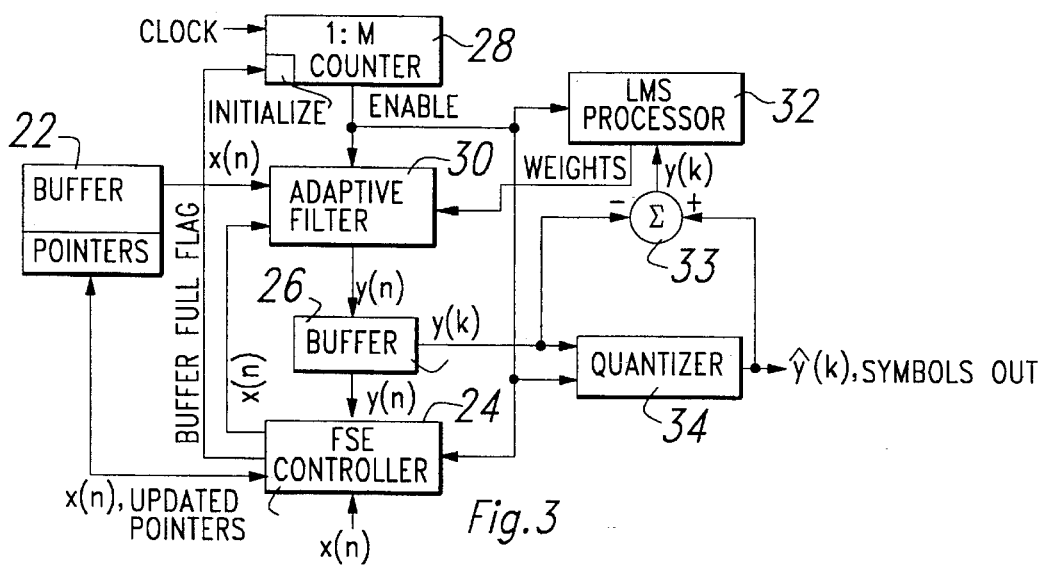
FIG. 3 shows a more detailed block diagram of an equalizer controlled using the present invention.

FIG. 3 shows a more detailed block diagram of the equalizer 20 controlled using the system and method of the present invention. As shown in FIG. 3, the equalizer 20 includes an adaptive filter 30, a least means square (LMS) processor 32, and a quantizer 34.

The adaptive filter 30 includes a set of N coefficients, or taps, which are updated by the LMS processor 32 to optimize the adaptive filter's 30 response to changing line or transmission conditions. The adaptive filter 30 thus weights the sampled data, x(n), to remove or minimize the effects of the channel through which the sampled data, x(n), was transmitted producing an output, y(n). In one embodiment of the present invention, the adaptive filter 30 is a transversal filter, however, it is contemplated that one of a number of other filter types may be used such as a symmetric transversal filter or a lattice filter. It is further contemplated that the adaptive filter 30 may be either a finite impulse response (FIR) filter or an infinite impulse response (IIR) filter.

The LMS processor 32 adjusts the weights or coefficients of the taps defining the adaptive filter 30 in an attempt to minimize the error e(k) between the actual response, y(k) of the adaptive filter 30 and the desired response, $\hat{y}(k)$. One embodiment of the LMS processor 32 of the present invention uses the standard LMS update algorithm, however, it is contemplated that another LMS update algorithm may be used including a normalized LMS, a Leaky LMS, a sign-error LMS or a sign-sign LMS algorithm. It is further contemplated that any other coefficient adaptation algorithm other than the gradient-based LMS algorithm can be used such as a recursive least squares (RLS) algorithm, a super exponential algorithm, or a higher order statistical algorithm.

The quantizer 34 retrieves output data, y(k), where k=n/M, from output memory 26 and quantizes the digitized signal producing output symbols $\hat{y}(k)$. Output symbols $\hat{y}(k)$ are subtracted from output data y(k) at summation 33 to generate the error signal e(k) which in input to the LMS processor 32. It is contemplated that the quantizer 34 includes a non-linear device such as a codebook detector which compares the output data, y(k), to codewords stored in the codebook.

Figure 4:
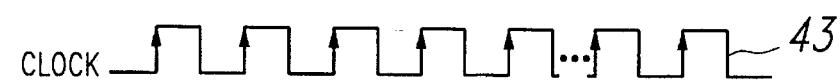
FIG. 4 is a timing diagram illustrating a sample clock cycle and resulting enables generated by the counter.
Figure 4:
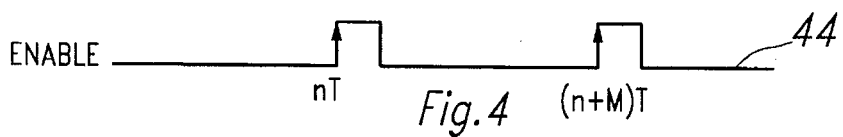

The adaptive filter 30, the LMS processor 32, the quantizer 34 and the FSE controller 24 all operate in response to the enable signal generated by the counter 28. FIG. 4 shows, at 42 a sample clock cycle and, at 44, the resulting enables generated by the counter 28.

Figure 5:
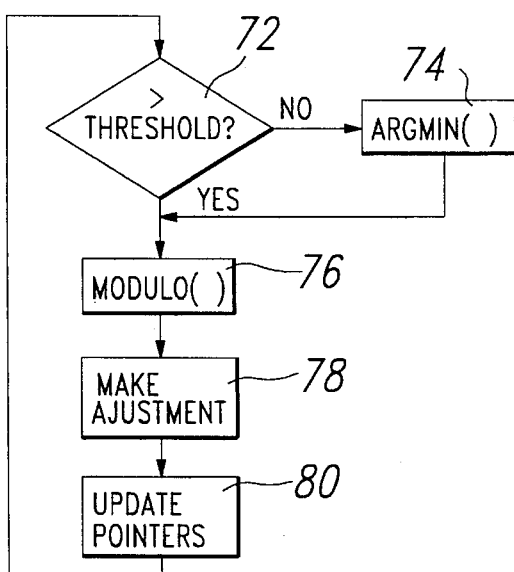
FIG. 5 depicts a flow diagram of the present invention.

The operation of the FSE controller 24 is illustrated in the flow diagram of FIG. 5. One simulation of the FSE controller 24 in the programming language C using a programmable general purpose digital signal processor is given in Appendix A, herein incorporated by reference in it's entirety.

As illustrated in FIG. 5, the FSE controller 24 performs initialization at block 52 which includes initializing the pointer and buffer data structures in input memory 22. As data samples, x(n) are received from the communications channel, the FSE controller 24 stores these data samples, x(n), in input memory 22 updating the pointers accordingly. Decision blocks 56 and 58 ensure that at least N+M−1 data samples are stored in the input memory 22 before processing continues. A buffer full flag is then generated at block 60.

The FSE controller 24 continues to store data samples to the input memory 22 until, at decision block 62, an enable signal is received from the counter 28. Upon receipt of the enable signal, the FSE controller 24 sends N data sample to the equalizer 64. Then, if there are at least N filtered data samples stored in the output memory 26, the FSE controller 24 retrieves those N filtered data samples at block 68 and at block 70 determines the argument of the data sample with the highest electrical signal value.

If that electrical signal value is not above a predetermined threshold, as determined at decision block 72, processing continues at block 74 where the argument of the data sample with the lowest electrical signal value is determined instead giving an offset, n'. The modulus function is used at block 76 to adjust the offset, n', in accordance with M, the oversampling rate, producing k'. An offset data pointer $n_{new}$ is calculated at block 78 using the formula $n_{new}=k-M/2$. This offset data pointer, $n_{new}$, is then used at block 80 to update the read data pointer and the write data pointer stored in input memory 22.

Figure 6:
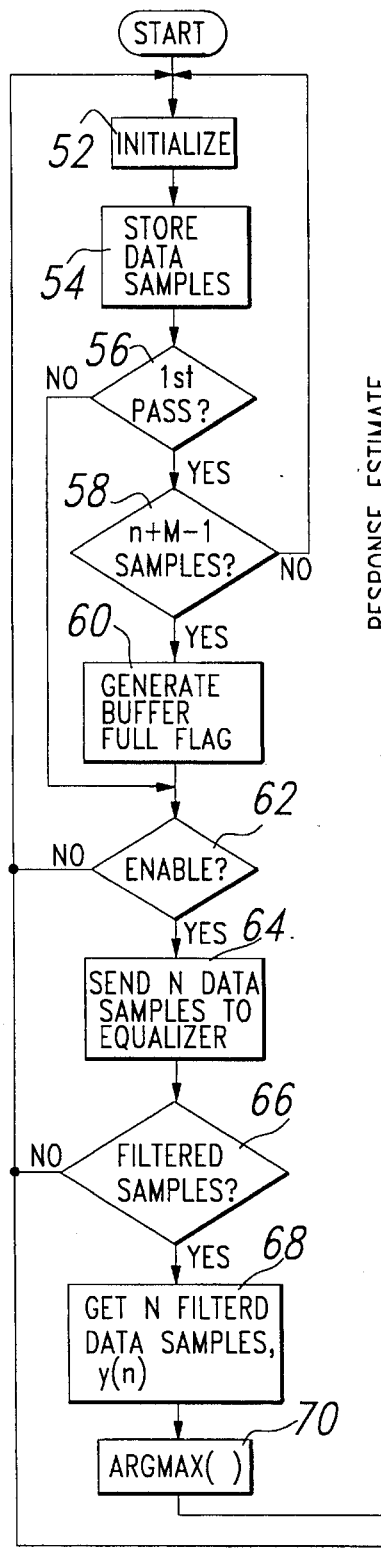
FIG. 6 illustrates a graph showing an estimated impulse response of an exemplary channel.
Figure 6:
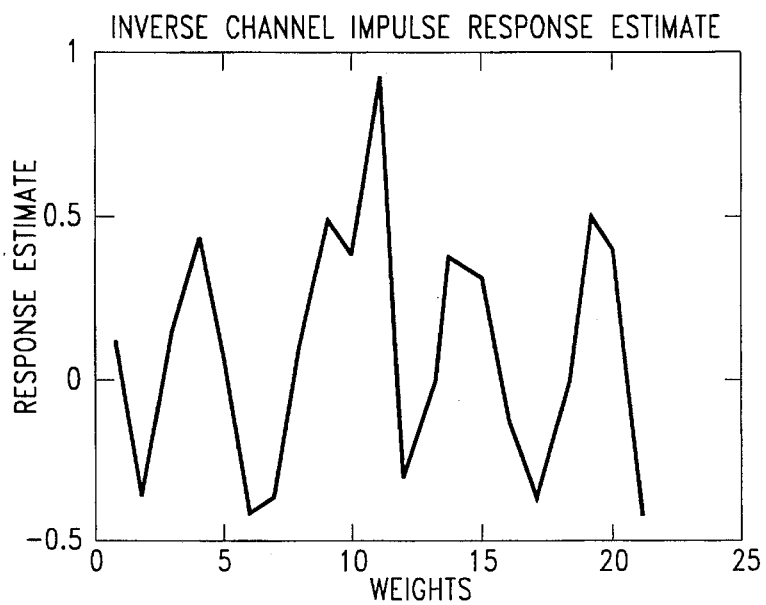
Figure 7:
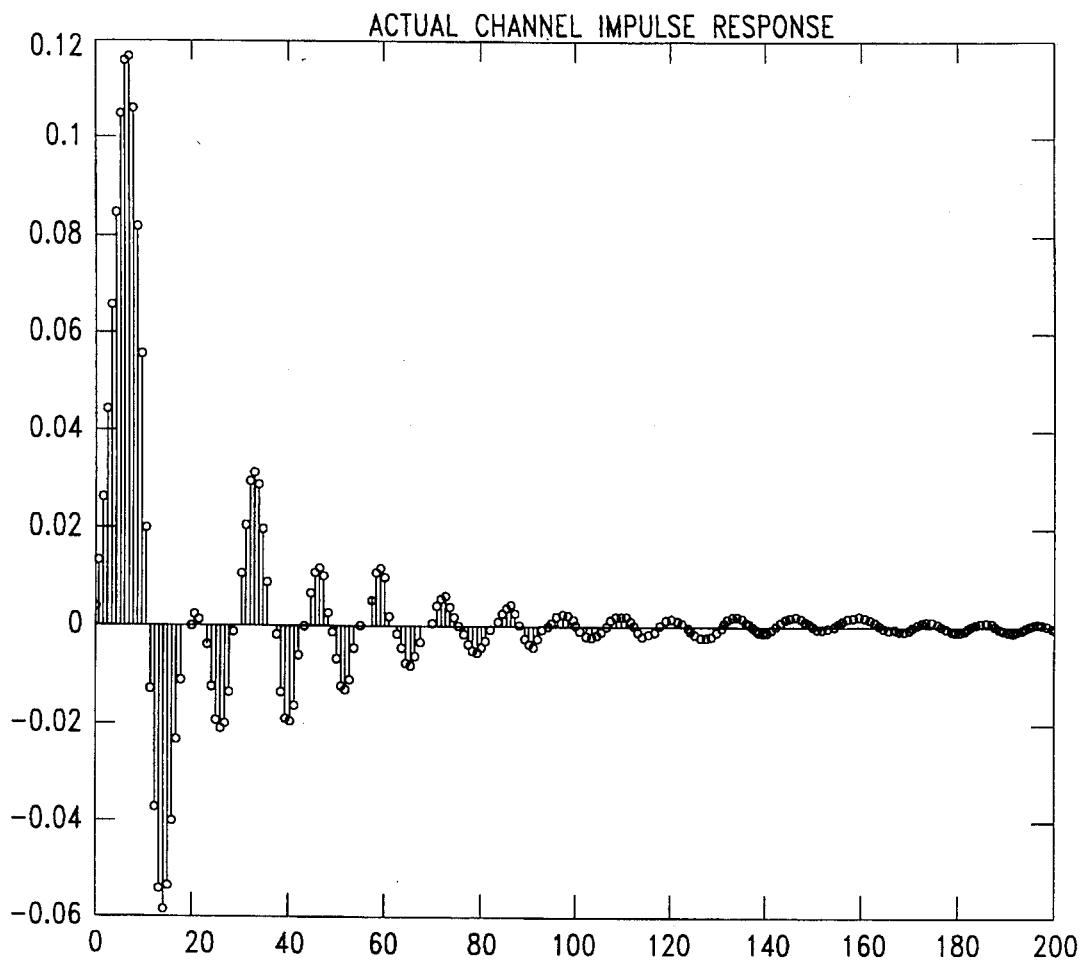
FIG. 7 shows a spectrum illustrating the actual channel impulse response of the exemplary channel.
Figure 8:
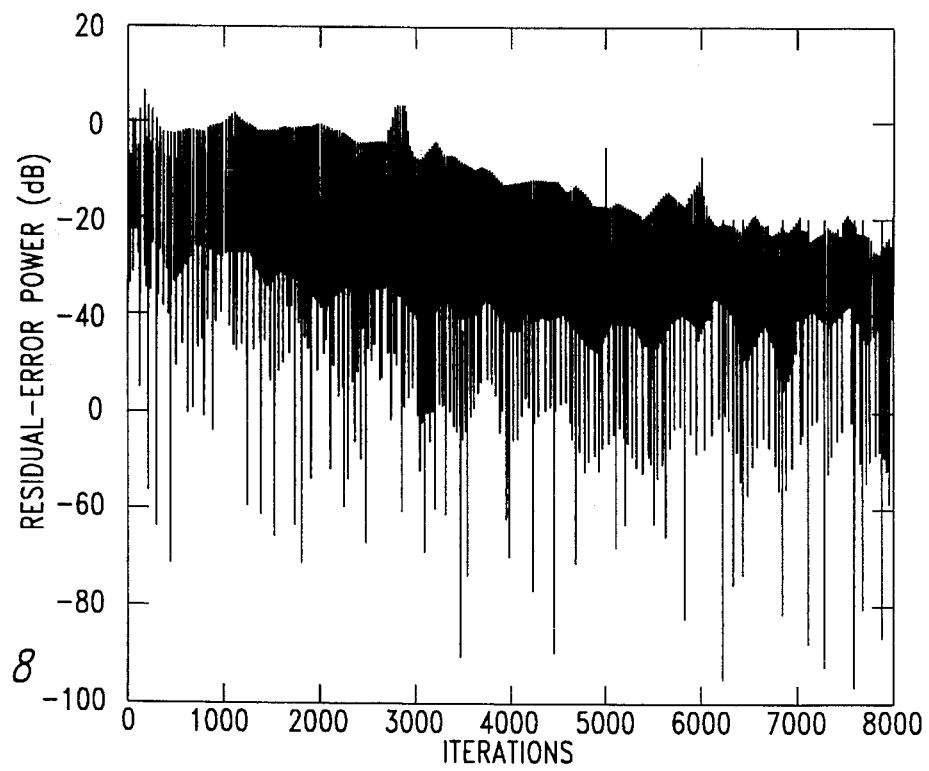
FIG. 8 shows the residual error learning curve using the present invention.

FIG. 6 shows an estimated impulse response for an exemplary channel. FIG. 7 illustrates the actual impulse response of the exemplary channel. Using the method and system of the present invention to control equalization of the exemplary channel, results in, after 8000 iterations, the residual error learning curve shown in FIG. 8.

Although the preferred embodiment has been described in detail, it should be understood that various changes, substitutions and alterations can be made thereto without departing from the spirit and scope of the present invention as defined by the appended claims.

APPENDIX A

```
© Copyright 1994, Texas Intruments, Incorporated
%
%   Equalizer Software - Uses Bussgang Blind Adaptive Equalizer
%   Created by MSA - 11/94
%   Updated by MSA - 12/12/94
%
lendat=8000;                              % 1 sec of data to test
y=round(rand(1,lendat));                  % Generate randomized NRZ data (PN sequence)
for i=1:lendat
    if y(i)==0, y(i)=-1.0; end
end
mu=.1;                                    % Set mu for adaptation
p=21;    % Equalizer length (fractional spacing) p=21/M=3 = 7 symbols
elms=zeros(1,lendat-p);                   % Error learning curve
% Build Channel Model
Rp=5;
Rs=50;
[N,Wn]=ellipord(.1667,.25,Rp,Rs);
[B,A]=ellip(N,Rp,Rs,Wn);
% Pass I (or Q) data through channel
newy=[];                                  % Build memory for interpolated y (only for simulations)
for i=1:length(y)
    newy=[newy y(i) y(i) y(i) y(i) y(i) y(i)];
end
r=filter(B,A,newy);                       % Filter the data through the channel
r=r+0.005.*randn(1,length(r));            % Add noise
r=decimate(r,2);    % r is now T/3 spaced % Make data T/3 (M=3 for
simulation)
% LMS Based Adaptive Equalizer
% initialize transversal filter weights
xlms=zeros(p,1);
xlms(ceil(p/2))=1.0;
yf=filter(xlms,1,r(1:p));                 % Initialize by filtering with impulse
[rmax,imax]=max(yf);                      % Then determine where of n in T/n we need
[rmin,imin]=min(yf);                      % to begin filtering
if abs(rmax)>abs(rmin),                   % Max wins?
    istart=imax;
    kslice=imax;
else
    istart=imin;
    kslice=imin;
end
init=1;
for i=istart:3:lendat*3-p*3,
    yf=filter(xlms,1,r(i:p+i-1));         % filter the signal at T/3
    xhat=sign(yf(p));                     % may want to try to check e to be
    e=xhat-yf(p);                         % below a certain level, o.w. pick
    xlms=xlms+mu*conj(e)*r(p+i-1:-1:i)';  % a new k value
    elms(i/3)=abs(e);
    [yfvmax,yfimax]=max(yf);              % Find max (or min)
    modyfi=rem(yfimax,3)-1;               % Modulo(i,M)
    i=i+modyfi;                           % update i
end
rf=filter(xlms,1,r);
rfout=decimate(rf,3);
for i=1:lendat
    if rfout(i)>1.0 rfout(i)=1.0; end;
    if rfout(i)<0.0 rfout(i)=0.0; end;
end
% Generate Plots
```

APPENDIX A-continued

```
plot(xlms)
title('Echo Channel Impluse Response Estimate')
xlabel('iterations')
ylabel('Response Estimate')
pause;
plot(20*log10(abs(elms)),'--g')
title('Residual Error Learning Curve')
xlabel('iterations')
ylabel('Residual-Error Power (dB)')
```

What is claimed is:

1. A method of controlling an equalizer, said equalizer coupled to a data channel, data transmitted through said data channel being oversampled at oversampling rate M, comprising steps of:

initializing a plurality of data pointers and a first buffer stored in an input memory;

generating a buffer full flag in response to filling said first buffer with a pre-determined number of data samples;

initializing a counter in response to said buffer full flag, said counter generating an enable signal every M cycles;

equalizing a portion of said pre-determined number of data samples in response to said enabling signal, said portion of said pre-determined number of data samples located using said plurality of data pointers; and adjusting said plurality of data pointers in response to said equalizing step.

2. A method of controlling an equalizer, said equalizer coupled to a data channel, data transmitted through said data channel being oversampled at oversampling rate M, said equalizer including an adaptive filter, and said adaptive filter having a filter length N, comprising steps of:

initializing a plurality of data pointers and a first buffer stored in an input memory;

generating a buffer full flag in response to filling said first buffer with N+M−1 data samples;

initializing a counter in response to said buffer full flag, said counter generating an enable signal every M cycles;

equalizing N of said N+M−1 data samples in response to said enabling signal, said N of said N+M−1 data samples located using said plurality of data pointers; and adjusting said plurality of data pointers in response to said equalizing step.

3. A method of controlling an equalizer, said equalizer coupled to a data channel, data transmitted through said data channel being oversampled at oversampling rate M, said equalizer including an adaptive filter, and said adaptive filter having a filter length N, comprising steps of:

initializing a plurality of data pointers and a first buffer stored in an input memory;

generating a buffer full flag in response to filling said first buffer with N+M−1 data samples;

initializing a counter in response to said buffer full flag, said counter generating an enable signal every M cycles;

equalizing N of said N+M−1 data samples in response to said enabling signal, said N of said N+M−1 data samples located using said plurality of data pointers;

generating filtered output data in response to said equalizing step; and adjusting said data pointers in response to said equalizing step.

4. The method of claim 3, wherein said adjusting step includes the steps of:

determining a first argument of an element of said filtered output data which has a maximum value;

determining in response to said maximum value being below a predetermined threshold a second argument of an element of said filtered output data with a minimum value;

performing a modulus operation between said first argument or said second argument and M, thereby generating an adjustment factor, k;

determining a pointer offset using said adjustment factor; and adjusting said plurality of data pointers using said pointer offset.

5. The method of claim 3 wherein said step of adjusting said plurality of data pointers includes the steps of adjusting a data read pointer and adjusting a data write pointer.

6. An apparatus for controlling an equalizer, said equalizer used to equalize a data channel, transmitted data from said data channel being oversampled at an oversampling rate M, comprising:

first means for generating a buffer full flag in response to storing a predetermined number of data samples into a first buffer;

second means responsive to said buffer full flag for generating an enable signal every M cycles;

said equalizer responsive to said enable signal for equalizing a portion of said pre-determined number of data samples, said portion of said pre-determined number of data samples determined using a plurality of data pointers into said first buffer;

third means responsive to said enable signal for adjusting said plurality of data pointers in response to filtered output data from said equalizer.

7. An apparatus for controlling an equalizer, said equalizer used to equalize a data channel, transmitted data from said data channel being oversampled at an oversampling rate M, said equalizer including an adaptive filter having a filter length N, comprising:

first means for generating a buffer full flag in response to storing N+M−1 data samples into a first buffer;

second means responsive to said buffer full flag for generating an enable signal every M cycles;

said equalizer responsive to said enable signal for equalizing N of said N+M−1 data samples, said N of said N+M−1 data samples determined using a plurality of data pointers into said first buffer;

third means responsive to said enable signal for adjusting said plurality of data pointers in response to filtered output data from said adaptive filter in said equalizer.

\* \* \* \* \*